United States Patent [19]

Sugita

[11] Patent Number: 5,550,639
[45] Date of Patent: Aug. 27, 1996

[54] RECORDING APPARATUS HAVING DIFFERENT MODES FOR READING AND PHOTOGRAPHING DOCUMENTS

[75] Inventor: Shigeru Sugita, Sayama, Japan

[73] Assignee: Canon Kabushiki Kaisha, Tokyo, Japan

[21] Appl. No.: 212,794

[22] Filed: Mar. 15, 1994

[30] Foreign Application Priority Data

Mar. 31, 1993 [JP] Japan ................................. 5-098937

[51] Int. Cl.⁶ .................................................. H04N 1/21
[52] U.S. Cl. ............................ 358/302; 355/18; 355/46; 358/401; 358/483
[58] Field of Search .......................... 355/18, 46, 244; 358/296, 300, 302, 401, 483

[56] References Cited

U.S. PATENT DOCUMENTS

| | | | |
|---|---|---|---|
| 4,632,538 | 12/1986 | Lemelson et al. | 355/244 |
| 4,864,420 | 9/1989 | Aiko | 358/302 |
| 4,930,016 | 5/1990 | Yazawa et al. | 358/296 |
| 5,184,227 | 2/1993 | Foley | 358/302 |

*Primary Examiner*—Fred L. Braun
*Attorney, Agent, or Firm*—Fitzpatrick, Cella, Harper & Scinto

[57] ABSTRACT

A recording apparatus photographs document images on a microfilm and photoelectrically reads the document images. The apparatus enables a mode to be selected in which only the reading of document images is executed. In a mode in which only the photographing of images on a microfilm is executed, efficient photographing is possible by making full use of the ability of the photographing device to photograph at high speed. A mode in which the document is photographed on the microfilm at the same time that the document is being read can also be selected.

20 Claims, 3 Drawing Sheets

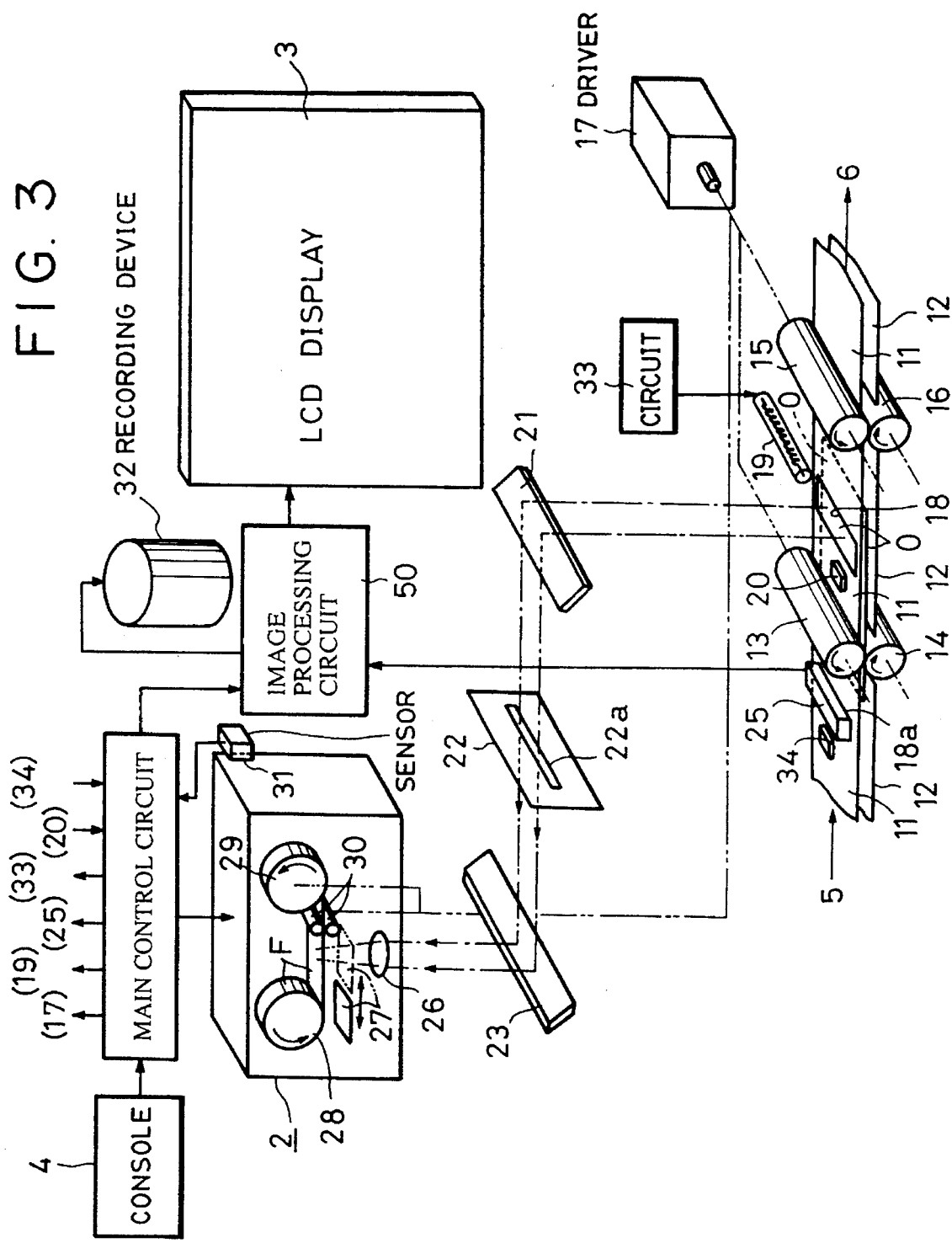

RECORDING APPARATUS HAVING DIFFERENT MODES FOR READING AND PHOTOGRAPHING DOCUMENTS

BACKGROUND OF THE INVENTION

1. Field of the Invention

The present invention relates to a recording apparatus which photographs a document image on a microfilm, and reads the document image as an electric signal (digital image reading) by means of a photoelectric conversion device.

2. Description of the Related Art

In a known conventional recording apparatus of the above type, an image of a document introduced into the apparatus is photographed on a microfilm as the document is conveyed in the apparatus, and, at the same time, the image is read by means of a photoelectric conversion device.

In the above recording apparatus, the speed at which documents are conveyed is preset to a fixed, relatively low speed due to the following reason: although the images of the documents can be photographed on the microfilm at high speed, it is not easy for the photoelectric conversion device to read the images at a correspondingly high speed. To increase the reading speed to a level at which it can keep pace with the high-speed photographing, it would be necessary to provide a high-speed/high-sensitivity photoelectric conversion device and, further, a high-speed image processing circuit, resulting in the apparatus becoming very complicated and expensive. Thus, the document conveying speed has to be set at a reasonable level conforming with the reading speed of the reading means, which is relatively low, to prevent the cost of the apparatus from increasing and the structure thereof from becoming more complicated.

The operator can check each of the images read by the reading means, which consists of a photoelectric conversion device, by displaying them one by one on a display before recording them on a recording medium, such as a magneto-optical disc. When this checking is to be performed, the operator has to feed the documents one by one into the apparatus at appropriate intervals or a document feeding mechanism for feeding documents at proper intervals has to be provided at a position on the upstream side of the photographing and reading position with respect to the direction in which the documents are conveyed. However, such a manual feeding operation by the operator is rather bothersome, while, on the other hand, the provision of a feeding mechanism as mentioned above leads to an increase in cost and a more complicated structure of the recording apparatus.

SUMMARY OF THE INVENTION

It is accordingly an object of the present invention to provide a recording apparatus which eliminates the above problems and which is capable of efficiently recording a large number of documents.

Another object of the present invention is to provide a recording apparatus which allows various types of recording modes to be selected and which enables documents to be easily dealt with.

Still another object of the present invention is to provide a recording apparatus which has a simplified structure and which is capable of high-speed recording.

To achieve the above objects, in accordance with one aspect of the present invention there is provided a recording apparatus comprising document conveying means for conveying documents, photographing means for photographing images of the documents conveyed by the document conveying means on a microfilm, and reading means for reading the images as electric signals by means of a photoelectric conversion device. In addition, mode switching means switches the execution of the photographing and recording by this apparatus between the following execution modes:

(a) a first execution mode for executing the photographing by the photographing means;

(b) a second execution mode for executing both the photographing and reading by the photographing means and reading means, respectively; and (c) a third execution mode for executing the reading by the reading means.

Further, in accordance with the present invention, there is provided a recording apparatus with speed switching means for changing the document conveying speed in accordance with the execution mode selected from among the first through third execution modes.

As stated above, the apparatus of the present invention advantageously enables the third execution mode (control mode) to be selected, in which the reading of the images of documents as electric signals is executed by the photoelectric conversion device.

When the first execution mode, in which the photographing of images on a microfilm is executed, is selected, the document conveying speed is switched to a higher speed, thereby enabling the images to be efficiently photographed on the microfilm, thus making full use of the ability of the photographing means to photograph at high speed.

When the second execution mode, in which both the photographing and reading by the photographing means and reading means, respectively, are executed, or the third execution mode, in which the reading by the reading means is executed, is selected, the document conveying speed is appropriately switched to a lower speed. Thus, when images read by the reading means are displayed one by one on a display so as to be checked by the operator before being recorded on a recording medium such as a magneto-optical disc, a sufficient interval is ensured between the display of one image and that of the next one, so that the operator can carefully check the images.

In accordance with another aspect of the invention, a recording apparatus which records document images on a plurality of recording media comprises first optical means for projecting the document images on a first recording medium, electrical reading means for electrically reading images, and second optical means for projecting the document images on the electrical reading means. Recording means records signals representing the images output from the electrical reading means on a second recording medium, and mode selection means selects between a first mode for recording on a first recording medium, a second mode for recording on both first and second recording media, and a third mode for recording on the second recording medium.

Accordingly, the apparatus provides satisfactory operability. Further, there is no need to increase the image reading speed or to provide a special mechanism for enabling documents to be fed at appropriate intervals. Thus, it is possible to prevent the apparatus structure from becoming more complicated, an increase in the cost thereof, etc.

These and other objects, aspects, features and advantages of the present invention will become apparent from the following detailed description of the preferred embodiments taken in conjunction with the drawings.

BRIEF DESCRIPTION OF THE DRAWINGS

FIG. 3 is a perspective view showing the internal construction of a photographing apparatus according to a second embodiment of the present invention.

DETAILED DESCRIPTION OF THE PREFERRED EMBODIMENTS

First Embodiment

Figure 1:
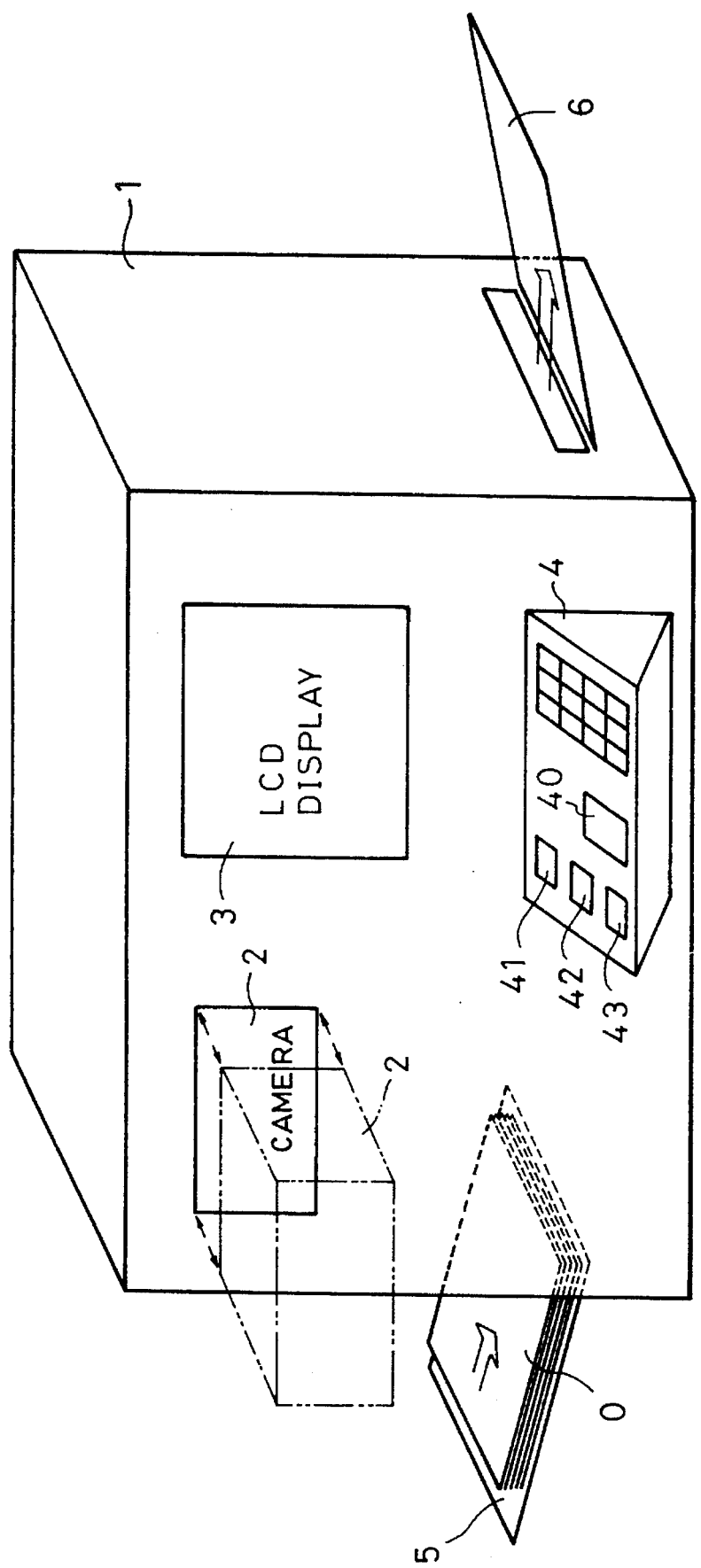
FIG. 1 is a perspective view showing the outward appearance of a photographing apparatus according to a first embodiment of the present invention.
Figure 2:
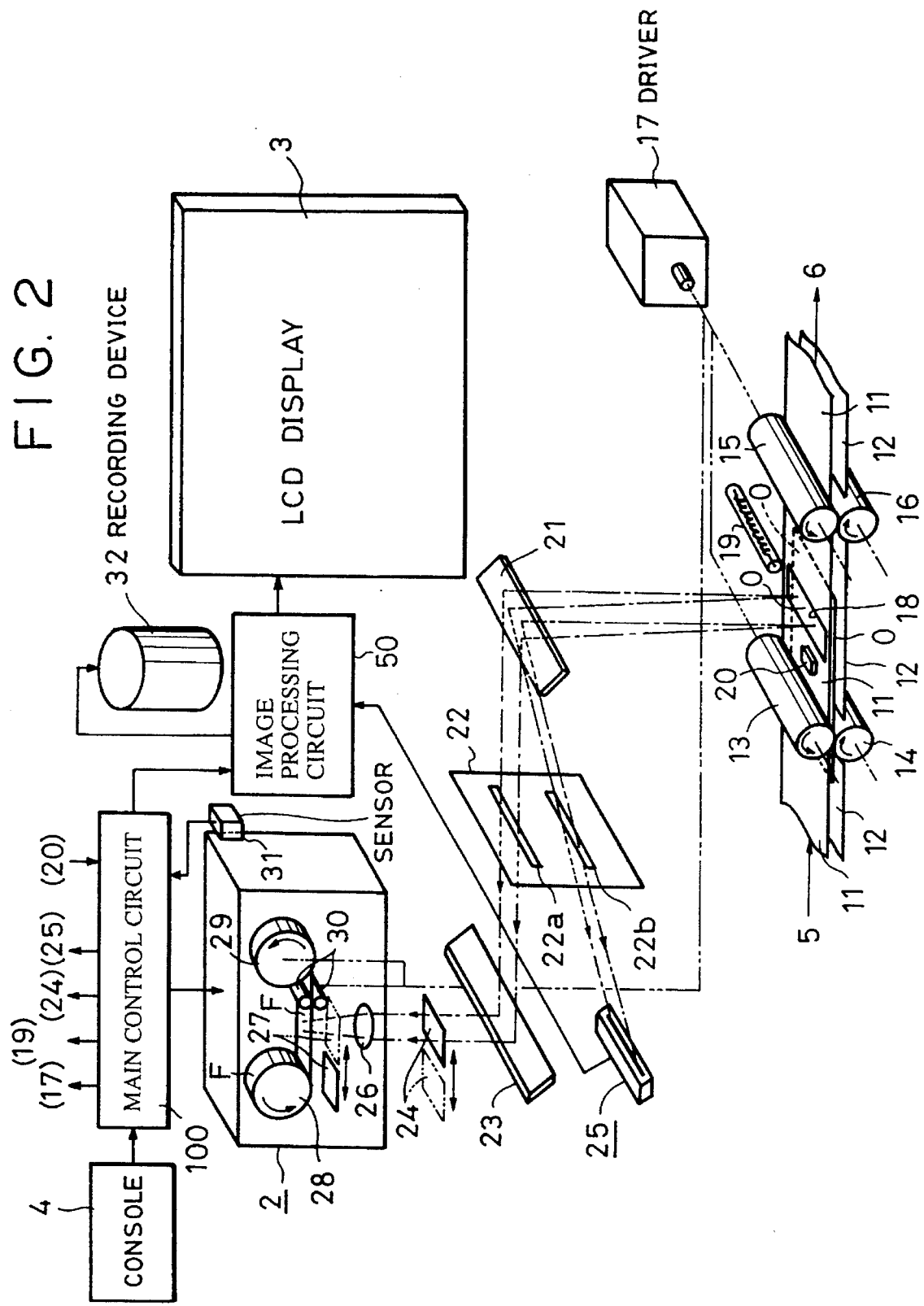
FIG. 2 is a perspective view showing the internal construction of the apparatus.

FIG. 1 is a perspective view showing the outward appearance of a photographing apparatus according to the first embodiment of the present invention, and FIG. 2 is a perspective view showing the internal construction of the apparatus.

Each of the elements shown in block outline in FIGS. 1 and 2, as well as in FIG. 3, is well known per se, and a specific type of construction is not critical to carrying out the invention or to a disclosure of the best mode for carrying out the invention.

Referring to FIG. 1, numeral 1 indicates a box constituting the casing of the apparatus; and numeral 2 indicates a camera unit constituting the photographing means. In the apparatus of this embodiment, the camera unit is detachable with respect to the front side of the apparatus. Numeral 3 indicates a display (LCD) provided on the front side of the apparatus; numeral 4 indicates an operating section (console section); numeral 5 indicates a paper feed tray provided on the left-hand side (as seen in the drawing) of the apparatus; and numeral 6 indicates a paper discharge tray provided on the right-hand side of the apparatus. Symbol O indicates a plurality of documents piled up on the paper feed tray 5, the image sides thereof being turned upward.

As will be described below, the documents O piled up on the paper feed tray 5 are fed one by one into the apparatus by a feeding means and conveyed within the apparatus by a conveying means. During the conveyance of the documents, the images of the documents are photographed on a microfilm by the photographing means and/or read by the reading means before the documents are discharged onto the paper discharge tray 6.

Referring to FIG. 2, numerals 11 and 12 indicate upper and lower document guide plates constituting a document conveying path extending from the paper feed tray 5 to the paper discharge tray 6; and numerals 13, 14, 15 and 16 indicate first and second pairs of document conveying rollers spaced apart from each other and arranged on the upstream and downstream sides with respect to the direction in which documents are conveyed. The first and second pairs of document feeding rollers are rotated so as to convey documents by a force transmitted to the rollers from a drive source 17 through a power transmission system (not shown).

The drive source 17 consists of a motor, gears, clutches, etc. and contains speed switching means for switching the rotating speed in accordance with a signal input from a mode switching means 41, 42 and 43, which will be described below.

Numeral 18 indicates a laterally elongated document illuminating slot formed in the upper guide 11, at a position between the first and second pairs of document conveying rollers 13, 14, 15 and 16 (the document photographing/reading position); numeral 19 indicates a halogen lamp for illuminating documents; and numeral 20 indicates a document sensor (a reflection type photo sensor) provided between the document illuminating slot 18 and the first pair of document conveying rollers 13 and 14.

The image of each of the documents O, turned upward, is illuminated by the lamp 19 as it passes by the slot 18, and the illuminating light reflected from the image is conveyed to the camera unit 2 by the following route: a first reflection mirror 21→a first slit 22a of a slit plate 22→a second reflection mirrors 23→a light quantity adjusting filter 24. Further, the illuminating light reflected from the image is also conveyed by the route: the first reflection mirror 21→a second slit 22b of the slit plate 22 before it is led to a (×1) magnification-type CCD array unit 25 (a photoelectric conversion device), which constitutes the image reading means.

The camera unit 2 contains an image formation lens 26, a shutter 27, a reel 28 for feeding a microfilm F, a take-up reel 29 for the microfilm F, a pair of capstan rollers 30, etc.

Numeral 31 indicates a sensor (a reflection type photo sensor) for detecting the camera unit 2 attached to the apparatus body. By being attached to the apparatus body in the normal fashion, the camera unit 2 is mechanically and electrically connected to the apparatus body. For example, the microfilm take-up reel 29 and the pair of capstan rollers 30 are connected to the drive source 17 in the apparatus body through a power transmission system (not shown), whereby they can be rotated by the drive source 17.

Numeral 100 indicates a main control circuit, to which a key operation signal from the operating section 4, a signal from the document sensor 20, a signal from the camera unit attachment detecting sensor 31, etc. are input. The main control circuit 100 further controls a shutter drive mechanism (not shown) of the camera unit 2, the drive source 17, the lamp 19, the CCD array unit 25, a drive mechanism (not shown) of the light quantity adjusting filter 24, and an image processing circuit 50.

Signal from the CCD array unit 25 are input to the image processing circuit 50 to control the display 3 and an MOD (magneto-optical disc) recording device 32.

In the operating section 4 of FIG. 1, numeral 40 indicates a start/stop switch. Numerals 41, 42 and 43 respectively indicate first, second and third selection push-button switches, which serve as the mode switching means and which contain LEDs.

When the first push-button switch 41 is depressed, the LED contained therein comes on to indicate that the switch 41 has been selected. At the same time, the main control circuit 100 of the apparatus is switched to a first execution control mode (first mode) for executing only the photographing by the camera unit 2 serving as the image information photographing means.

When the second push-button switch 42 is depressed, the LED contained therein comes on to indicate that the switch 42 has been selected. At the same time, the main control circuit 100 of the apparatus is switched to a second execution control mode (second mode) in which both photographing by the camera unit 2 and reading by the CCD array unit 25, serving as the reading means, are executed.

When the third push-button switch 43 is depressed, the LED contained therein comes on to indicate that the switch 43 has been selected. At the same time, the main control circuit 100 of the apparatus is switched to a third execution control mode (third mode) in which only the reading by the CCD array unit 25 is executed.

(1) Apparatus Operation in the First Execution Mode

When the first push-button switch 41 is depressed in order to execute only the photographing of document image information by the camera unit 2, the speed switching means of the drive source 17 is set to a document conveying speed of 60 m/min by the main control circuit 100. The light quantity adjusting filter 24 is moved to a position which is away from the optical path leading from the second reflection mirror 23 to the camera unit 2, and is retained at the position. In this mode, the image reading by the CCD array unit 25 is held inexecutable.

When, in this condition, the start/stop switch 40 is depressed, one of the documents O piled up on the paper feed tray 5 is separated from the pile and fed into the apparatus by a sheet separating/feeding means (not shown). Further, the drive source 17 operates to feed the document along the document conveying path, which is composed of the guide plates 11 and 12 and the first and second pairs of document conveying rollers 13, 14, 15 and 16, at the above-mentioned speed of 60 m/min. Further, the lamp 19 comes on.

When the leading edge of the document being conveyed is detected by the sensor 20, provided on the upstream side of the document illuminating slit 18, the pair of capstan rollers 30 and the microfilm take-up reel 29 provided inside the camera unit 2 are started to be driven on the basis of a detection signal from the sensor 20, thereby driving the microfilm F. The film driving is effected at a speed corresponding to the document conveying speed and the photographing magnification by means of the drive force transmitted from the drive source 17 through the power transmission system.

Simultaneously with the above film driving, the shutter 27 is opened by a shutter driving mechanism (not shown), whereby the image information of the document O passing the position of the document illuminating slot 18 is transmitted to the surface of the film F through the optical system: the first reflection mirror 21→the first slit 22a→the second reflection mirror 23→the image formation lens 26, and slit-exposed on the surface of the film F to be photographed in a reduced size.

When the trailing edge of the document O being transmitted is detected by the sensor 20 and the document O has passed the position of the slot 18, the shutter 27 is closed. At the same time, the driving of the pair of capstan rollers 30 and the microfilm take-up reel 29 is stopped. The document thus photographed is discharged onto the paper discharge tray 6.

In this way, the documents O piled up on the paper feed tray 5 are fed one by one into the apparatus, and only the successive photographing of their images on the microfilm F is executed.

In this embodiment, the document conveying speed in the first execution mode, in which only the photographing by the camera unit 2 is executed, is set to a relatively high speed of 60 m/min, thus making full use of the high-speed photographing ability of the camera unit 2 serving as the image photographing means.

(2) Apparatus Operation in the Second Execution Mode

When the second push-button switch 42 is depressed in order to execute both the photographing and reading of document images by the camera unit 2 and the CCD array unit 25, respectively, the main control circuit 100 sets the speed switching means for the drive source 17 to a document conveying speed of 14.28 m/min, which is lower than the speed in the first execution mode described in the above (1).

To prevent overexposure of the microfilm due to the reduction in the speed at which the document is conveyed, the light quantity adjusting filter 24 is moved to a position in the optical path between the second reflection mirror 23 and the camera unit 2 and retained at the position. Due to this interception of the optical path by the filter 24, the quantity of light impinging upon the camera unit 2 is reduced to approximately ¼.

When, in this condition, the start/stop switch 40 is depressed, the documents O in the paper feed tray 5 are fed one by one into the apparatus, and, as in the operation in the first execution mode, described in the above (1), the images of the documents being conveyed are successively photographed on the microfilm F.

In this process, the film is driven by the pair of capstan rollers 30 and the microfilm take-up reel 29 in the camera unit 2 at a speed corresponding to the document conveying speed which has been switched to the lower level, by the driving force transmitted from the drive source 17 through the power transmission system.

Together with the photographing of the documents by the camera unit 2, the reflected illuminating light from the documents O, passing through the document illuminating slit 18, is transmitted through the route: the first reflection mirror 21→the second slit 22b, and impinges upon the light receiving section of the CCD array unit 25. The document image is photoelectrically read by the CCD array unit 25, which is driven with a storage time of 0.534 msec. and at an image transfer clock frequency of 3.19 MHz.

Then, a document image reading signal from the CCD array unit 25 is input to the image processing circuit 50, and, each time a document O passes the document illuminating slot 18, the image of the document read is displayed on the display (LCD) 3. Further, the image is also recorded on a magneto-optical disc by an MOD (magneto-optical disc) recording device 32. The documents which have undergone photographing and recording are successively discharged onto the paper discharge tray 6.

While in the first execution mode described in the above (1) the documents were conveyed at the relatively high speed of 60 m/min., they are conveyed in the second execution mode at the relatively low speed of 14.28 m/min. In this manner, when the operator checks each of the document images, read by the CCD array unit 25, displayed on the display 3 before recording them on a magneto-optical disc, a sufficient length of time for checking is ensured between the display of one document image and that of the next one.

Thus, this apparatus provides satisfactory operability, and requires neither increasing of the document image reading speed nor provision of a special mechanism for ensuring appropriate intervals between documents being conveyed, thereby preventing a complication of the apparatus structure, an increase in cost, etc.

(3) Apparatus Operation in the Third Execution Mode

When the third push-button switch 43 is depressed in order to execute only the reading of document images by the CCD array unit 25, the main control circuit 100 sets the speed switching means of the drive source 17 such that documents are conveyed at a speed of 14.28 m/min., as in the second execution mode. The pair of capstan rollers 30 and the microfilm take-up reel 29 of the camera unit 2 are not driven, and the shutter 27 is kept in the closed state. Thus, the photographing of document images by the camera unit 2 is held inexecutable.

When in this condition the start/stop switch 40 is depressed, the documents O on the paper feed tray 5 are, as in the second execution mode described above, fed one by one into the apparatus and conveyed at the speed of 14.28 m/min. The images of the documents thus fed are read by the CCD array unit 25 (with a storage time of 0.534 m/min. and at an image transfer clock frequency of 3.19 MHz). The images thus read are displayed one by one on the display 3, and recorded on the magneto-optical disc by the magneto-optical disc recording device 32. The documents which have been read are successively discharged onto the paper discharge tray 6.

The document conveying speed in the third execution mode, 14.28 m/min., is also set relatively low as compared with that in the first execution mode, which is 60 m/min., so that when the document images successively read by the CCD array unit 25 are displayed one by one on the display 3 so as to be checked by the operator, a sufficient length of time for checking can be ensured between the display of one document image and that of the next one.

Thus, this recording apparatus excels in operability. Further, there is no need to increase the speed at which the document image reading process is conducted, nor is it necessary to provide a special mechanism for ensuring sufficient intervals between the documents being conveyed, thereby preventing a complication of the apparatus structure, an increase in cost, etc.

Second Embodiment

FIG. 3 is a perspective view showing the internal construction of an apparatus according to the second embodiment of the present invention.

In the apparatus of this embodiment, the CCD array unit 25 includes an LED array, a rod lens array, and a (×1) magnification-type CCD. This unit 25 is provided on the upstream side of the first pair of document conveying rollers 13 and 14 with respect to the direction in which documents are conveyed, and fronts the laterally elongated slot 18a (the illuminating position), whereby the images of documents being conveyed are read in a contact system (Thus, the second slit 22b is done away with). Further, the light quantity adjusting filter 24 is also done away with. Instead, a light quantity adjusting circuit 33 for setting the light quantity of the halogen lamp 19 is provided and controlled by the main control circuit 100. Apart from these points, the apparatus of this embodiment has the same construction as the apparatus of the first embodiment described with reference to FIGS. 1 and 2.

The reading of a document image by the CCD array unit 25 is started in response to a document leading edge detection signal from a document sensor (reflection type photo sensor) 34 provided on the upstream side of the unit 25 with respect to the direction in which documents are conveyed.

The photographing of a document image by the camera unit 2 is started in response to a document leading edge detection signal from the document sensor 20, as in the case of the apparatus of the first embodiment.

The control operations performed in the first through third execution modes, selected by the first through third push-button switches 41 through 43, respectively, are substantially the same as those in the apparatus of the first embodiment described above. In the apparatus of this embodiment, however, the light quantity of the halogen lamp 19 in the first execution mode is controlled by the light quantity adjusting circuit 33 in such a way that it corresponds to the high document conveying speed of 60 m/min. In the second execution mode, the light quantity adjusting circuit 33 causes the halogen lamp 19 to emit a quantity of light which is approximately ¼ of that in the first execution mode in order to prevent overexposure of the microfilm due to the lower document conveying speed of 14.28 m/min.

Third Embodiment

In the first and second embodiments described above, the camera unit 2 was attached to the apparatus body, and, when its attachment is detected by the sensor 31, it is possible to select one of the first through third execution modes by the first through third push-button switches 41, 42 and 43 serving as the mode switching means.

In this embodiment, when the camera unit 2 is not attached to the apparatus body, the control system of the apparatus is automatically set, in response to a unit-not-attached signal from the sensor 31, to the third execution mode, in which only the image reading by the CCD array unit 25 is executed. In this execution mode, the built-in LED in the third push-button switch 43 comes on, thereby indicating to the operator that the third execution mode has been selected.

In this condition, no change of mode can be effected by depressing the first or second push-button switch 41 or 42. Only when the camera unit 2 has been attached to the apparatus body and detected by the sensor 31 can the apparatus be restored to the condition in which any of the first through third execution modes can be arbitrarily selected.

While in the first embodiment the CCD array unit 25 is a (×1) multiplication-type, it is also possible for the CCD array unit 25 to be a smaller type which includes a reduction lens arranged in the optical path leading from the second slit 22b to the CCD array unit 25.

Although the drive source 17 in the first through third embodiments is a variable speed drive source consisting of a motor, gears, clutches, etc, it is also possible for the drive source to consist of a speed variable motor or the like which is electrically controlled.

Further, while, in the first through third embodiments, the sensor 31 for detecting the non-attached state of the camera unit 2 is provided, it is not particularly necessary to provide the sensor 31 in the case of in which the camera unit 2 stores the remaining amount of the microfilm F, etc. and performs communications with the photographing apparatus body. It is then possible to tell whether the camera unit 2 is attached to the apparatus body or not from the communicating condition.

As described above, the present invention provides a recording apparatus having a function by which it photographs document images on a microfilm and a function by which it reads document images as electric signals by means of a photoelectric conversion device, wherein it is advantageously possible to select a control mode in which only the reading of document images as electric signals by means of a photoelectric conversion device is executed.

In the control mode in which only the photographing of document images on a microfilm is executed, it is possible to efficiently photograph images on a microfilm by making full use of the ability of the photographing means to photograph at high speed.

In the control mode in which both the photographing and reading are executed by the photographing means and reading means, respectively, or in the control mode in which only the reading by the reading mode is executed, there is a sufficient interval between the display of one image and that of the next, so that when the operator checks the images successively read by the reading means by displaying them one by one on a display before recording them on a recording medium, such as a magneto-optical disc or an optical disc, it is possible for the operator to carefully check the images.

Thus, this apparatus provides satisfactory operability, and requires neither increasing of the document image reading speed nor provision of a special mechanism for ensuring appropriate intervals between documents being conveyed, thereby preventing a complication of the apparatus structure, an increase in cost, etc.

Although specific embodiments of the present invention have been described above in detail, it will be understood that this description is merely for purposes of illustration. Various modifications of and equivalent structures corresponding to the disclosed aspects of the preferred embodiments in addition to those described may be made by those skilled in the art without departing from the spirit of the present invention which is defined in the following claims, the scope of which is to be accorded the broadest interpretation so as to encompass such modifications and equivalent structures.

What is claimed is:

1. A recording apparatus comprising:

document conveying means for conveying documents along a predetermined path;

photographing means for photographing images of the documents conveyed by said document conveying means on a film;

reading means for reading the images of the documents conveyed by said conveying means and for generating electric signal representing the images; and mode selection means for selecting between a first mode for executing the photographing by said photographing means, a second mode for executing both the photographing by said photographing means and reading by said reading means, and a third mode for executing the reading by said reading means.

2. A recording apparatus according to claim 1, further comprising speed switching means for switching the speed at which the documents are conveyed, wherein the switching is effected in accordance with the mode selected by said mode selection means.

3. A recording apparatus according to claim 2, wherein said speed switching means is operated to convey the documents at a higher speed when the first mode is selected than when the second or third mode is selected.

4. A recording apparatus according to claim 3, wherein said reading means includes a CCD array.

5. A recording apparatus according to claim 1, wherein said photographing means includes a unit containing a pair of reels for taking up a film, said unit being detachable with respect to the apparatus body.

6. A recording apparatus according to claim 5, wherein said unit has a lens for forming images of the documents on the film.

7. A recording apparatus according to claim 6, further comprising detection means for detecting if said unit is attached to the apparatus body, wherein said mode selection means selects a mode based on whether said unit is attached to the apparatus body or not.

8. A recording apparatus according to claim 7, wherein said mode selection means automatically sets the third mode when said detection means does not detect said unit.

9. A recording apparatus according to claim 1, further comprising controlling means for controlling the exposure of the film in accordance with the mode selected by said mode selection means.

10. A recording apparatus according to claim 9, wherein said control means includes a filter movable into and out of an optical path formed by said photographing means for adjusting the quantity of light transmitted along the optical path.

11. A recording apparatus according claim 10, wherein said filter is moved out of the optical path when said mode selecting means selects the first mode.

12. A recording apparatus according to claim 10, wherein said filter is moved into the optical path when said mode selecting means selects the second or third mode.

13. A recording apparatus which records document images on a plurality of recording media, said recording apparatus comprising:

first optical means for projecting document images on a first recording medium;

electrical reading means for electrically reading document images;

second optical means for projecting the document images on said electrical reading means;

recording means for recording signals representing the images output from said electrical reading means on a second recording medium; and mode selection means for selecting between a first mode for recording on the first recording medium, a second mode for recording on both said first and second recording media, and a third mode for recording on said second recording medium.

14. A recording apparatus according to claim 13, further comprising:

conveying means for conveying the documents to illuminating positions of said first and second optical means; and speed control means for changing the speed at which the documents are conveyed in accordance with the mode selected by said mode selection means.

15. A recording apparatus according to claim 14, wherein the first and second optical means share a common illuminating position.

16. A recording apparatus according to claim 14, wherein the illuminating position of said first optical means is spaced apart from the illuminating position of said second optical means with respect to the direction in which the documents are conveyed.

17. A recording apparatus according to claim 13, wherein said first recording medium is a microfilm.

18. A recording apparatus according to claim 17, wherein said second recording medium is a magneto-optical disc.

19. A recording apparatus according to claim 13, further comprising control means for controlling the exposure of the film in accordance with the mode selected by said mode selection means.

20. A recording apparatus according to claim 19, wherein said control means includes illuminating means and a circuit for adjusting the quantity of light emitted by said illuminating means based on the mode selected by said mode selection means.

* * * * *

UNITED STATES PATENT AND TRADEMARK OFFICE
CERTIFICATE OF CORRECTION

PATENT NO. : 5,550,639
DATED : August 27, 1996
INVENTOR(S) : Sugita

It is certified that error appears in the above-indentified patent and that said Letters Patent is hereby corrected as shown below:

COLUMN 4:

Line 11, "mirrors" should read --mirror--.
Line 39, "Signal" should read --Signals--.

COLUMN 9:

Line 31, "signal" should read --signals--.

COLUMN 10:

Line 10, "according" should read --according to--.

Signed and Sealed this

Twenty-second Day of April, 1997

Attest:

BRUCE LEHMAN

Attesting Officer

Commissioner of Patents and Trademarks